(12) United States Patent
Yasuda

(10) Patent No.: US 6,740,898 B2
(45) Date of Patent: May 25, 2004

(54) RADIATION IMAGE INFORMATION READ-OUT METHOD AND APPARATUS

(75) Inventor: Hiroaki Yasuda, Kaisei-machi (JP)

(73) Assignee: Fuji Photo Film Company, Limited, Kanagawa-ken (JP)

( * ) Notice: Subject to any disclaimer, the term of this patent is extended or adjusted under 35 U.S.C. 154(b) by 196 days.

(21) Appl. No.: 09/949,712

(22) Filed: Sep. 12, 2001

(65) Prior Publication Data
US 2002/0030169 A1 Mar. 14, 2002

(30) Foreign Application Priority Data

Sep. 11, 2000 (JP) ........................................ 2000-275256

(51) Int. Cl.7 ............................................. G03B 42/08
(52) U.S. Cl. ...................................... 250/587; 250/586
(58) Field of Search ................................. 250/587, 584, 250/586, 585

(56) References Cited

U.S. PATENT DOCUMENTS

| 4,346,295 A | | 8/1982 | Tanaka et al. | |
|---|---|---|---|---|
| 4,855,598 A | | 8/1989 | Ohgoda et al. | |
| 4,896,037 A | | 1/1990 | Shimura et al. | |
| 5,402,338 A | * | 3/1995 | Ito | 600/407 |
| 5,477,059 A | * | 12/1995 | Arakawa | 250/587 |
| 5,483,081 A | * | 1/1996 | Hosoi | 250/585 |
| 5,533,142 A | * | 7/1996 | Takeo | 382/128 |
| 5,602,402 A | * | 2/1997 | Yasuda | 250/587 |
| 5,877,508 A | * | 3/1999 | Arakawa et al. | 250/588 |
| 6,016,356 A | | 1/2000 | Ito et al. | |
| 6,239,448 B1 | * | 5/2001 | Kawai | 250/586 |
| 6,495,851 B1 | * | 12/2002 | Yasuda | 250/587 |

FOREIGN PATENT DOCUMENTS

| JP | 7-319092 | | 12/1995 | |
|---|---|---|---|---|
| JP | 8-116435 | | 5/1996 | |
| JP | 08190162 A | * | 7/1996 | ............ G03B/42/02 |

OTHER PUBLICATIONS

Patent Abstract of Japan 08–116435 May 7, 1996.

* cited by examiner

Primary Examiner—Albert Gagliardi
(74) Attorney, Agent, or Firm—Sughrue Mion, PLLC

(57) ABSTRACT

Two image signals representing radiation image information are acquired from opposite surfaces of a stimulable phosphor sheet, on which the radiation image information has been stored. Operation processing is performed on the two image signals in accordance with predetermined operation processing parameters, and an operation-processed image signal representing the radiation image information is obtained. A ratio between read-out sensitivities with respect to the opposite surface sides of the sheet and/or the predetermined operation processing parameters with respect to at least either one surface side of the sheet are controlled in accordance with read-out conditions employed at the time of the image signal acquisition.

12 Claims, 3 Drawing Sheets

| 1 | 1 | 1 | 1 | 1 |
|---|---|---|---|---|
| 1 | 2 | 2 | 2 | 1 |
| 1 | 2 | 3 | 2 | 1 |
| 1 | 2 | 2 | 2 | 1 |
| 1 | 1 | 1 | 1 | 1 |

MASKING PROCESSING PARAMETERS
IN ORDINARY IMAGE READ-OUT OPERATIONS

| 0 | 0 | 0 | 0 | 0 |
|---|---|---|---|---|
| 0 | 1 | 1 | 1 | 0 |
| 0 | 1 | 3 | 1 | 0 |
| 0 | 1 | 1 | 1 | 0 |
| 0 | 0 | 0 | 0 | 0 |

MASKING PROCESSING PARAMETERS
FOR IMAGE HAVING A PIXEL DENSITY
OF ONE HALF OF THAT OF ORDINARY IMAGES

RADIATION IMAGE INFORMATION READ-OUT METHOD AND APPARATUS

BACKGROUND OF THE INVENTION

1. Field of the Invention

This invention relates to a radiation image information read-out method and apparatus, wherein a technique for detecting light emitted from opposite surfaces of a stimulable phosphor sheet and thereby detecting two image signals from the opposite surfaces of the stimulable phosphor sheet is employed, and an operation-processed image signal is obtained from the two image signals.

2. Description of the Related Art

In various fields, such as the medical field, techniques for reading out a radiation image of an object, which has been recorded on a stimulable phosphor sheet, to obtain an image signal, performing predetermined image processing on the image signal, and thereafter displaying a visible image, which is reproduced from the processed image signal, on an image display device, such as a cathode ray tube (CRT) display device, or outputting the visible image on film with a printer, such as a laser printer (LP), have heretofore been utilized. As apparatuses for reading out the radiation image, for example, computed radiography (CR) apparatuses, in which digital image processing techniques utilizing computers are employed, have heretofore been utilized.

The CR apparatuses are radiation image recording and read-out apparatuses. With the radiation image recording and read-out apparatuses, a radiation image of an object, such as a human body, is recorded on a sheet provided with a layer of a stimulable phosphor (hereinafter referred to as a stimulable phosphor sheet). The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal with photoelectric read-out means, such as a photomultiplier. Recently, the CR apparatuses are widely used in practice.

As techniques for photoelectrically detecting light is emitted by a stimulable phosphor sheet, the applicant proposed techniques for detecting light emitted from opposite surfaces of a stimulable phosphor sheet and thereby detecting two image signals from the opposite surfaces of the stimulable phosphor sheet in, for example, U.S. Pat. No. 4,346,295 and Japanese Unexamined Patent Publication No. 8(1996)-116435. With the proposed techniques, two photoelectric read-out means are located respectively on opposite surface sides of the stimulable phosphor sheet. Also, stimulating rays are irradiated to the two surfaces or only to one surface of the stimulable phosphor sheet, and the light, which is emitted by the stimulable phosphor sheet when it is exposed to the stimulating rays, is photoelectrically detected on the opposite surface sides of the stimulable phosphor sheet.

Specifically, with the techniques for detecting light emitted from opposite surfaces of a stimulable phosphor sheet and thereby detecting two image signals from the opposite surfaces of the stimulable phosphor sheet, a stimulable phosphor sheet is formed by overlaying a stimulable phosphor layer on a surface of a transparent substrate, and a radiation image is stored on the stimulable phosphor sheet. The stimulable phosphor sheet, on which the radiation image has been stored, is fitted on a transparent holder, and two photoelectric read-out means are located respectively above and below the holder. In this state, the light, which is emitted from one surface side of the stimulable phosphor sheet when the stimulable phosphor sheet is exposed to the stimulating rays, is detected by the photoelectric read-out means located above the holder, and an image signal (a one surface side image signal) is thereby detected. Also, the light, which is emitted from the other surface side of the stimulable phosphor sheet when the stimulable phosphor sheet is exposed to the stimulating rays, is detected by the photoelectric read-out means located below the holder, and an image signal (an other surface side image signal) is thereby detected.

Thereafter, an addition operation is performed on the image signal components of the two image signals having been detected from the opposite surfaces of the stimulable phosphor sheet (i.e., the one surface side image signal and the other surface side image signal), which image signal components represent corresponding pixels on the one surface and the other surface of the stimulable phosphor sheet, and an addition image signal (a superposition image signal) is thereby obtained. With the addition operation, high frequency noise occurring at random in each of the one surface side image signal and the other surface side image signal can be smoothed. Also, since the emitted light is collected from the two surfaces of the stimulable phosphor sheet, the light collecting efficiency can be enhanced. As a result, a superposition image, which has good image quality with an enhanced signal-to-noise ratio, can be reproduced from the addition image signal.

Also, as techniques for obtaining radiation image information by utilizing stimulable phosphor sheets, or the like, subtraction processing (subtraction operation) techniques have heretofore been known. With the subtraction processing techniques, a plurality of radiation images are recorded under different conditions and are then read out to obtain a plurality of image signals. Thereafter, a subtraction operation is performed on the plurality of the image signals, and a subtraction image signal is thereby obtained. In this manner, a subtraction image corresponding to the difference between the plurality of the radiation images, i.e. a subtraction image in which only a pattern of a specific object part (hereinbelow referred to also as a pattern of a tissue, a structure, or the like) in the radiation images has been enhanced or extracted, is obtained. Basically, the subtraction processing techniques may be classified into a temporal (time difference) subtraction processing technique and an energy subtraction processing technique. The applicant proposed various energy subtraction processing techniques utilizing stimulable phosphor sheets in, for example, U.S. Pat. Nos. 4,855,598 and 4,896,037. In order for the plurality of the image signals for the subtraction processing to be obtained, it is also considered to utilize the aforesaid technique for detecting light emitted from opposite surfaces of a stimulable phosphor sheet and thereby detecting two image signals from the opposite surfaces of the stimulable phosphor sheet.

Also, in order for a signal-to-noise ratio to be enhanced over the entire frequency band of an image obtained from the addition operation or the subtraction processing, the applicant proposed a technique for performing masking processing on the image signal obtained from each of the opposite surfaces of a stimulable phosphor sheet, such that a parameter (a weight factor) appropriate for each of the opposite surfaces of the stimulable phosphor sheet and each of frequency bands is capable of being utilized, as disclosed in, for example, Japanese Unexamined Patent Publication No. 7(1995)-319092.

When the image signal is to be obtained from each of the opposite surfaces of the stimulable phosphor sheet, read-out conditions (read-out modes) are set, and thereafter the operation for reading out the radiation image information is performed. Examples of the read-out conditions include a level of stimulation energy (i.e., an intensity of the stimulating rays irradiated to the stimulable phosphor sheet), an image signal gathering range (i.e., a range of a radiation dose, over which the image signal is capable of being detected), a read-out pixel density, and a pixel sampling frequency. (The image signal gathering range is also referred to as the read-out gain.) The read-out conditions are set in accordance with the performance required of the image to be obtained. The image signal gathering ranges with respect to the opposite surface sides of the stimulable phosphor sheet are set to be identical with each other.

However, in cases where the level of stimulation energy, the pixel sampling frequency, or the like, varies, the image signal gathering range with respect to each of the opposite surface sides of the stimulable phosphor sheet, the frequency response of the image signal obtained from each of the opposite surfaces of the stimulable phosphor sheet, or the like, varies. Therefore, if the addition operation or the subtraction operation is performed by use of predetermined values of parameters for the operation processing, the problems will occur in that an appropriate image cannot always be obtained.

For example, in cases where the level of stimulation energy alters, the intensity of the light emitted from each of the opposite surfaces of the stimulable phosphor sheet alters. As a result, the frequency response and noise characteristics of the image signal, which is obtained from each of the opposite surfaces of the stimulable phosphor sheet, varies. Therefore, for example, if the image signals, which have been obtained from the opposite surfaces of the stimulable phosphor sheet, are weighted with the identical values of weight factors and subjected to the addition operation, much noise will occur in the operation-processed image, which is obtained from the addition operation, and an appropriate image cannot always be obtained.

Also, the inventors conducted extensive research and found that, besides the intensities of the light emitted from the opposite surfaces of the stimulable phosphor sheet, the ratio between the intensities of the light emitted from the opposite surfaces of the stimulable phosphor sheet also alter in accordance with the level of stimulation energy. It was also found that, in cases where the ratio between read-out sensitivities with respect to the opposite surface sides of the stimulable phosphor sheet is kept at a predetermined value, the image signal gathering range varies for the opposite surface sides of the stimulable phosphor sheet when the level of stimulation energy alters. In other words, if the ratio between the read-out sensitivities with respect to the opposite surface sides of the stimulable phosphor sheet is not adjusted in accordance with the level of stimulation energy, the image signal gathering ranges with respect to the opposite surface sides of the stimulable phosphor sheet cannot be kept identical with each other, and an operation-processed image having good image quality cannot be obtained.

Further, in cases where the read-out pixel density or the pixel sampling frequency varies, if the parameters for the masking processing are kept at predetermined values, the frequency characteristics of the image signal will vary, and therefore it will not always be possible to utilize a parameter (a weight factor) appropriate for each of the opposite surface sides of the stimulable phosphor sheet and each of frequency bands. In such cases, an operation-processed image having good image quality cannot be obtained.

SUMMARY OF THE INVENTION

The primary object of the present invention is to provide a radiation image information read-out method, wherein a technique for detecting light emitted from opposite surfaces of a stimulable phosphor sheet and thereby detecting two image signals from the opposite surfaces of the stimulable phosphor sheet is employed, and wherein an appropriate operation-processed image is capable of being obtained reliably regardless of read-out conditions having been set.

Another object of the present invention is to provide an apparatus for carrying out the radiation image information read-out method.

The present invention provides a radiation image information read-out method, comprising the steps of:

i) exposing a stimulable phosphor sheet, on which radiation image information has been stored, to stimulating rays, which cause the stimulable phosphor sheet to emit light in proportion to the amount of energy stored thereon during its exposure to radiation, ii) detecting light emitted from opposite surfaces of the stimulable phosphor sheet when the stimulable phosphor sheet is exposed to the stimulating rays, two original image signals representing the radiation image information being thereby acquired, and iii) performing operation processing on the two original image signals and in accordance with predetermined operation processing parameters, an operation-processed image signal, which represents the radiation image information, being thereby obtained, wherein a ratio between read-out sensitivities with respect to the opposite surface sides of the stimulable phosphor sheet and/or the predetermined operation processing parameters with respect to at least either one surface side of the stimulable phosphor sheet are controlled in accordance with read-out conditions employed at the time of the image signal acquisition.

The present invention also provides an apparatus for carrying out the radiation image information read-out method in accordance with the present invention. Specifically, the present invention also provides a radiation image information read-out apparatus, comprising:

i) stimulating ray irradiation means for irradiating stimulating rays to a stimulable phosphor sheet, on which radiation image information has been stored, the stimulating rays causing the stimulable phosphor sheet to emit light in proportion to the amount of energy stored thereon during its exposure to radiation, ii) image signal acquiring means for detecting light emitted from opposite surfaces of the stimulable phosphor sheet when the stimulable phosphor sheet is exposed to the stimulating rays, and thereby acquiring two original image signals representing the radiation image information, and iii) operation-processed image signal forming means for performing operation processing on the two original image signals and in accordance with predetermined operation processing parameters in order to obtain an operation-processed image signal, which represents the radiation image information, wherein the improvement comprises the provision of control means for controlling a ratio between read-out sensitivities with respect to the opposite surface sides of the stimulable phosphor sheet and/or the predetermined operation processing parameters with respect to at least either one surface side of the stimulable phosphor sheet, the controlling being performed in accordance with read-out conditions employed at the time of the image signal acquisition.

In the radiation image information read-out method and apparatus in accordance with the present invention, the operation processing, which is performed on the two original image signals and in accordance with the predetermined operation processing parameters, may be typically the addition operation or the subtraction operation described above. However, the operation processing is not limited to the addition operation and the subtraction operation.

Also, the ratio between the read-out sensitivities with respect to the opposite surface sides of the stimulable phosphor sheet may be controlled by controlling the read-out sensitivity with respect to one of the opposite surface sides of the stimulable phosphor sheet. Alternatively, both the read-out sensitivities with respect to the opposite surface sides of the stimulable phosphor sheet may be controlled, and the ratio between the read-out sensitivities with respect to the opposite surface sides of the stimulable phosphor sheet may thereby be controlled.

Further, as a technique for controlling the read-out sensitivity, one of various techniques maybe employed, with which the level of the image signal corresponding to the X-ray dose of a desired read-out range, e.g. the center value of the image signal corresponding to the center point of the desired read-out range, can be altered. As the technique for altering the center value of the image signal corresponding to the center point of the desired read-out range, for example, a technique for altering the voltage (high voltage) applied to a photomultiplier, which photoelectrically detects the emitted light, or a technique proposed by the applicant in, for example, Japanese Unexamined Patent Publication No. 2(1990)-108175, wherein signal transform is performed in accordance with a read-out sensitivity (a S value) in exposure data recognizer (EDR) processing in which no preliminary read-out operation is performed, may be employed.

Ordinarily, when the operation for reading out the radiation image information is performed, the image signal gathering range (i.e., the read-out gain) is set at a predetermined value. As a technique for setting the image signal gathering range, one of various techniques may be employed, with which the width of the image signal corresponding to the desired image signal gathering range is capable of being altered. For example, it is possible to employ a technique, wherein a gain of an amplifier for amplifying the signal obtained from the photomultiplier is altered, or a technique, wherein signal transform is performed in accordance with a latitude (a L value) in the EDR processing in which no preliminary read-out operation is performed.

In order for the ratio between the read-out sensitivities with respect to the opposite surface sides of the stimulable phosphor sheet to be controlled in accordance with the read-out conditions, a table, which represents correspondence relationship between various read-out conditions and read-out sensitivity ratios appropriate for the read-out conditions, may be prepared previously. Also, reference may be made to the table, and the read-out sensitivity ratio corresponding to the read-out conditions, which are employed in the operation for reading out the radiation image information, may thereby be set.

In order for the operation processing parameters to be controlled in accordance with the read-out conditions, a table, which represents correspondence relationship between various read-out conditions and operation processing parameters appropriate for the read-out conditions, may be prepared previously. Also, reference may be made to the table, and the operation processing parameters corresponding to the read-out conditions, which are employed in the operation for reading out the radiation image information, may thereby be set.

As for certain read-out conditions, a read-out mode, in which the detection of an image signal is performed only on one surface side of the stimulable phosphor sheet, may often be set. Also, it may often occur that a read-out mode, in which the detections of image signals are performed on the opposite surface sides of the stimulable phosphor sheet, is set, but a stimulable phosphor sheet, which allows the detection of the image signal from its one surface alone, is utilized. In such cases, the operation processing parameters may be set such that an image is constituted from only the image signal detected from the one surface of the stimulable phosphor sheet.

With the radiation image information read-out method and apparatus in accordance with the present invention, the ratio between the read-out sensitivities with respect to the opposite surface sides of the stimulable phosphor sheet and/or the operation processing parameters with respect to at least either one surface side of the stimulable phosphor sheet are controlled in accordance with the read-out conditions employed at the time of the image signal acquisition. Therefore, in cases where different read-out conditions are set, the operation for reading out the radiation image information is capable of being performed by setting the read-out sensitivity ratio and/or the operation processing parameters appropriate for the read-out conditions having been set, and an appropriate image is capable of being obtained.

Also, with the radiation image information read-out method and apparatus in accordance with the present invention, in cases where the specifications of the stimulable phosphor sheet are such that the stimulable phosphor sheet allows the detection of the image signal from its one surface side alone, the operation processing parameters may be set such that an image is constituted from only the image signal detected from the one surface of the stimulable phosphor sheet. In this manner, the image is capable of being reproduced from only the image signal, which has been detected accurately from one surface side (e.g., the stimulating ray irradiation surface side) of the stimulable phosphor sheet. Specifically, in cases where the read-out conditions concerning the specifications of the stimulable phosphor sheet are set, the image read-out processing is capable of being performed appropriately. Therefore, regardless of the read-out conditions, an appropriate image is capable of being obtained.

DESCRIPTION OF THE PREFERRED EMBODIMENTS

The present invention will hereinbelow be described in further detail with reference to the accompanying drawings.

Figure 1:
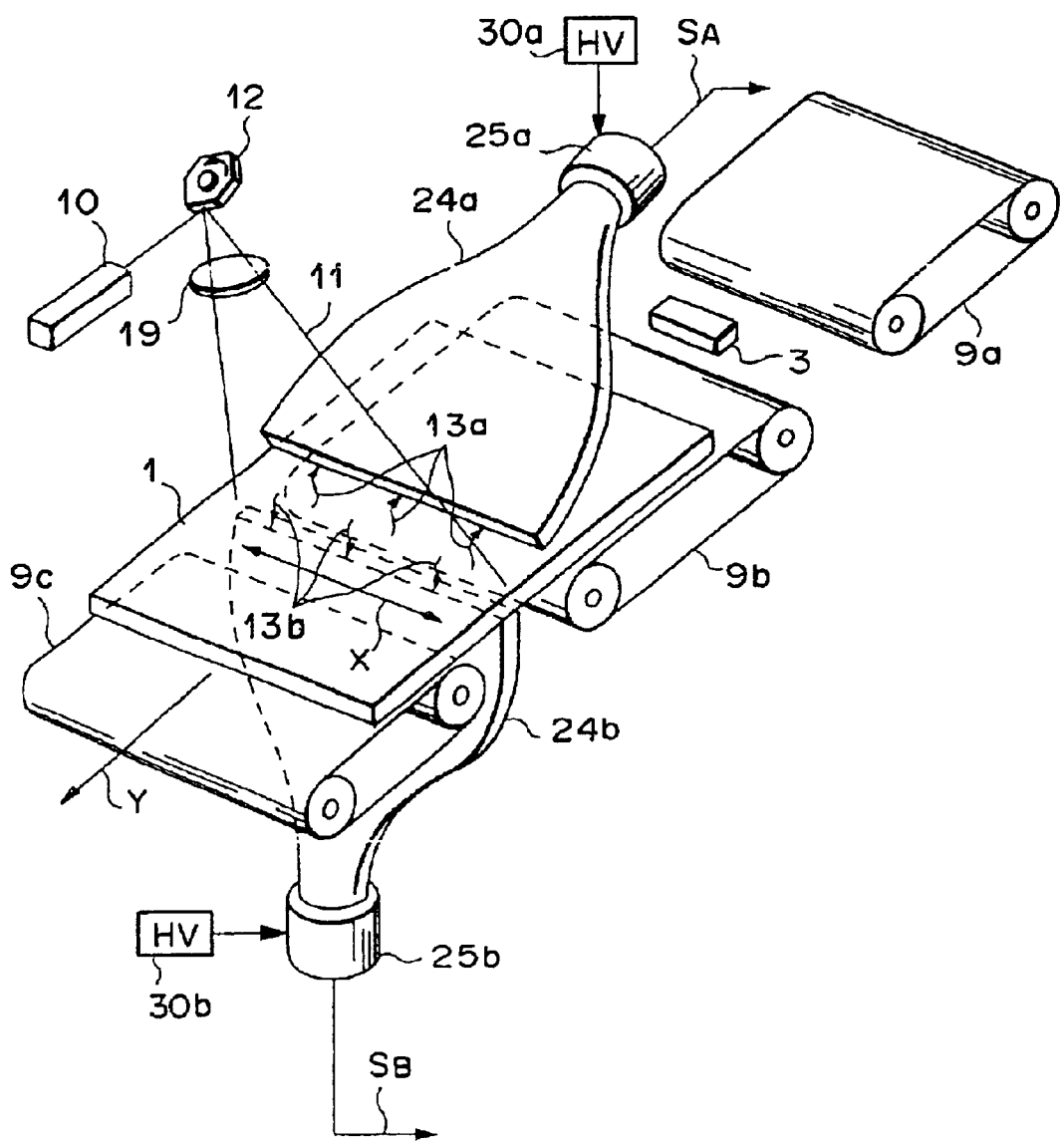
FIG. 1 is a perspective view showing an embodiment of the radiation image information read-out apparatus in accordance with the present invention, in which a technique for detecting light emitted from opposite surfaces of a stimulable phosphor sheet and thereby detecting two image signals from the opposite surfaces of the stimulable phosphor sheet is employed.
Figure 2:
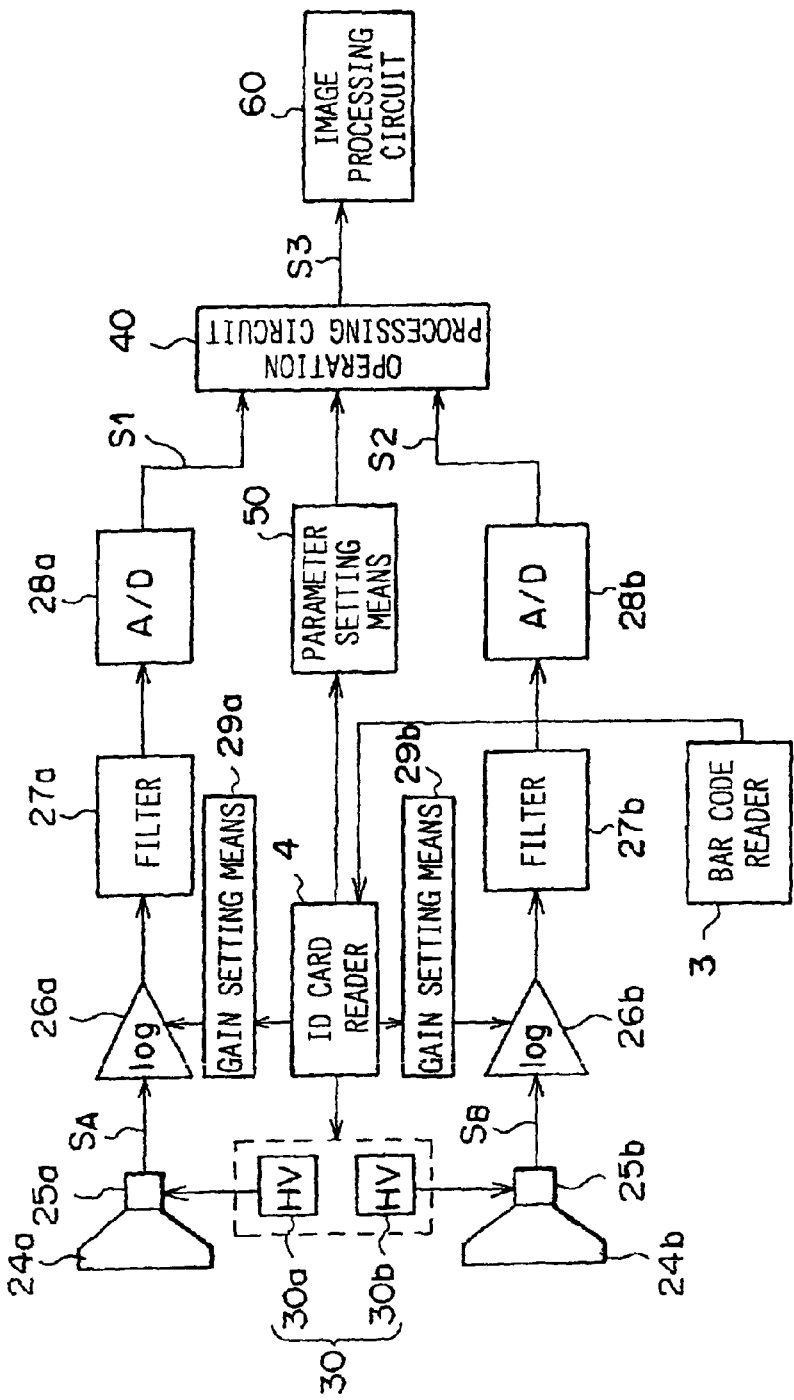
FIG. 2 is a circuit block diagram showing how signal processing is performed in the embodiment of FIG. 1.

FIG. 1 is a perspective view showing an embodiment of the radiation image information read-out apparatus in accordance with the present invention, in which a technique for detecting light emitted from opposite surfaces of a stimulable phosphor sheet and thereby detecting two image signals from the opposite surfaces of the stimulable phosphor sheet is employed. FIG. 2 is a circuit block diagram showing how signal processing is performed in the embodiment of FIG. 1.

As illustrated in FIG. 1, in the radiation image information read-out apparatus, a stimulable phosphor sheet 1, on which radiation image information has been stored, is placed on endless belts 9a, 9b, and 9c, which are rotated by motors (not shown). A bar code reader 3, which acts as discrimination means for discriminating the specifications of the stimulable phosphor sheet 1, is located between the endless belts 9a and 9b. Also, as illustrated in FIG. 2, the radiation image information read-out apparatus is provided with an identification (ID) card reader 4, which acts as read-out condition setting means. An output of the bar code reader 3 is fed into the ID card reader 4.

A laser beam source 10, a rotating polygon mirror 12, and a scanning lens 19 are located above the stimulable phosphor sheet 1, which is placed on the endless belts 9b and 9c. The laser beam source 10 produces a laser beam 11 acting as stimulating rays, which cause the stimulable phosphor sheet 1 to emit light in proportion to the amount of energy stored thereon during its exposure to radiation. The rotating polygon mirror 12 reflects and deflects the laser beam 11 having been produced by the laser beam source 10 and causes the laser beam 11 to scan the stimulable phosphor sheet 1 in main scanning directions indicated by the double headed arrow X. The rotating polygon mirror 12 is rotated by a motor (not shown). The scanning lens 19 converges the laser beam 11, which has been reflected and deflected by the rotating polygon mirror 12, onto the stimulable phosphor sheet 1 and causes the laser beam 11 to scan the stimulable phosphor sheet 1 at uniform speed. A light guide member 24a is located above and close to the position that is scanned with the laser beam 11. The light guide member 24a guides the light, which is emitted by the stimulable phosphor sheet 1 when the stimulable phosphor sheet 1 is scanned with the laser beam 11, from above. Also, a light guide member 24b is located below the position that is scanned with the laser beam 11. The light guide member 24b is located perpendicularly to the stimulable phosphor sheet 1 and guides the emitted light from below. The light guide member 24a is connected to a photomultiplier 25a for photoelectrically detecting the emitted light. Also, the light guide member 24b is connected to a photomultiplier 25b for photoelectrically detecting the emitted light. The photomultiplier 25a is connected to voltage applying means (HV) 30a, which constitutes sensitivity setting means 30 acting as an example of control means. Also, the photomultiplier 25b is connected to voltage applying means (HV) 30b, which constitutes the sensitivity setting means 30. The laser beam source 10, the rotating polygon mirror 12, and the scanning lens 19 constitute the stimulating ray irradiation means of the radiation image information read-out apparatus in accordance with the present invention. Also, the light guide members 24a, 24b and the photomultipliers 25a, 25b constitute the image signal acquiring means of the radiation image information read-out apparatus in accordance with the present invention.

As illustrated in FIG. 2, the output of the photomultiplier 25a is connected to a logarithmic amplifier 26a. The output of the logarithmic amplifier 26a is connected to a filter 27a. The output of the filter 27a is connected to an analog-to-digital converter 28a. Also, the output of the photomultiplier 25b is connected to a logarithmic amplifier 26b. The output of the logarithmic amplifier 26b is connected to a filter 27b. The output of the filter 27b is connected to an analog-to-digital converter 28b. The output of the analog-to-digital converter 28a and the output of the analog-to-digital converter 28b are connected to an operation processing circuit 40, which acts as the operation-processed image signal forming means. The output of the operation processing circuit 40 is connected to an image processing circuit 60. Also, parameter setting means 50 is connected to the operation processing circuit 40.

As the logarithmic amplifiers 26a and 26b, variable-gain amplifiers are employed. Gain setting means 29a is connected to the logarithmic amplifier 26a. Also, gain setting means 29b is connected to the logarithmic amplifier 26b.

The gain setting means 29a and the gain setting means 29b respectively set the gains of the logarithmic amplifiers 26a and 26b, such that an amplifier output width (i.e., a width of an image signal) with respect to the stimulating ray irradiation surface side of the stimulable phosphor sheet 1 and the amplifier output width (i.e., the width of the image signal) with respect to the other surface side of the stimulable phosphor sheet 1 become approximately identical with each other under arbitrary read-out conditions, i.e. such that an image signal gathering range with respect to the stimulating ray irradiation surface side of the stimulable phosphor sheet 1 and the image signal gathering range with respect to the other surface side of the stimulable phosphor sheet 1 become identical with each other under arbitrary read-out conditions. In this manner, the image signal gathering ranges with respect to the opposite surface sides of the stimulable phosphor sheet 1 are set to be identical with each other.

The output of the ID card reader 4 is connected to the sensitivity setting means 30 and the parameter setting means 50. In this manner, information concerning the read-out conditions having been set is fed into the sensitivity setting means 30 and the parameter setting means 50.

When radiation image signals are to be obtained with the radiation image read-out apparatus, firstly, an ID card is read by the ID card reader 4. In this manner, the read-out conditions, such as the level of stimulation energy (i.e., the intensity of the stimulating rays irradiated to the stimulable phosphor sheet), the image signal gathering range, the read-out pixel density, and the pixel sampling frequency, are set. The specifications of the stimulable phosphor sheet 1 are also set, depending upon the read-out conditions.

Thereafter, the stimulable phosphor sheet 1, on which the radiation image information of an object has been stored and which conforms to the read-out conditions, is set on the endless belt 9a. The stimulable phosphor sheet 1 is conveyed by the endless belt 9a in the direction (sub-scanning direction), which is indicated by the arrow Y. The stimulable phosphor sheet 1 is thus moved toward the endless belt 9b. The stimulable phosphor sheet 1 is appended with a bar code, which represents the specifications of the stimulable phosphor sheet 1. When the stimulable phosphor sheet 1 is moved from the endless belt 9a toward the endless belt 9b, the bar code appended to the stimulable phosphor sheet 1 is read by the bar code reader 3.

The bar code represents the information, such as the sensitivity of the stimulable phosphor sheet 1, the particle size of the stimulable phosphor, and the stimulable phosphor layer constitution. The information having been read by the bar code reader 3 is fed into the ID card reader 4, and a judgment is made as to whether the specifications of the stimulable phosphor sheet 1 conform or do not conform to the read-out conditions having been set.

In the sensitivity setting means 30, a table is prepared previously. The table represents correspondence relationship between various read-out conditions, including the specifications of the stimulable phosphor sheet 1, and read-out sensitivity ratios P appropriate for the read-out conditions. The read-out sensitivity ratio P is the ratio between the read-out sensitivities with respect to the opposite surface sides of the stimulable phosphor sheet 1 (i.e., the ratio between the center values of photomultiplier outputs (the image signals), which center values correspond to the center points of desired read-out ranges with respect to the opposite surface sides of the stimulable phosphor sheet 1). In this embodiment, the read-out sensitivity ratio P is represented by the formula P=Pa/Pb, wherein Pa represents the read-out sensitivity with respect to the stimulating ray irradiation surface side of the stimulable phosphor sheet 1, and Pb represents the read-out sensitivity with respect to the other surface side of the stimulable phosphor sheet 1.

The sensitivity setting means 30 makes reference to the table and sets the read-out sensitivity of at least either one of the photomultipliers 25a and 25b in accordance with the information concerning the read-out conditions, which information has been received from the ID card reader 4, such that the read-out sensitivity ratio conforming to the read-out conditions having been set, including the specifications of the stimulable phosphor sheet 1, is obtained. The setting of the read-out sensitivity is performed by altering and setting the magnitude of the high voltage applied to the photomultiplier 25a and/or the photomultiplier 25b.

Also, in the parameter setting means 50, a table representing correspondence relationship between various read-out conditions, including the specifications of the stimulable phosphor sheet 1, and the operation processing parameters appropriate for the read-out conditions is prepared previously. The parameter setting means 50 makes reference to the table and sets the operation processing parameters, which conform to the read-out conditions having been set, including the specifications of the stimulable phosphor sheet 1, in the operation processing circuit 40 and in accordance with the information concerning the read-out conditions, which information has been received from the ID card reader 4. In cases where the specifications of the stimulable phosphor sheet 1 are such that the stimulable phosphor sheet 1 allows the detection of an image signal from its one surface side alone, the parameter setting means 50 sets the operation processing parameters such that an image is constituted from only the image signal detected from the one surface of the stimulable phosphor sheet 1.

The stimulable phosphor sheet 1 is then conveyed by the endless belts 9b and 9c in the sub-scanning direction indicated by the arrow Y. The laser beam 11, which has been produced by the laser beam source 10, is reflected and deflected by the rotating polygon mirror 12, which is being driven by the motor (not shown) and quickly rotated in the direction indicated by the arrow. The laser beam 11 is then converged by the scanning lens 19 onto the stimulable phosphor sheet 1 and is caused to scan the stimulable phosphor sheet 1 in the main scanning directions indicated by the double headed arrow X. The main scanning directions are approximately normal to the sub-scanning direction indicated by the arrow Y. When the stimulable phosphor sheet 1 is thus exposed to the laser beam 11, light in accordance with the stored radiation image information is emitted by the exposed portion of the stimulable phosphor sheet 1. Specifically, light 13a is emitted from the upper surface side of the stimulable phosphor sheet 1, and light 13b is emitted from the lower surface side of the stimulable phosphor sheet 1.

The light 13a, which has been emitted from the upper surface side of the stimulable phosphor sheet 1, impinges upon a light input face of the light guide member 24a. The emitted light 13a enters the light guide member 24a from its light input face and is guided through repeated total reflection inside of the light guide member 24a. The emitted light 13a then emanates from a light output face of the light guide member 24a and is received by the photomultiplier 25a. In this manner, the emitted light 13a is converted by the photomultiplier 25a into an analog electric signal $S_A$, which is in accordance with the amount of the emitted light 13a, which amount represents the stored radiation image information. In the same manner as that described above, the emitted light 13b, which has been emitted from the lower surface side of the stimulable phosphor sheet 1, is guided inside of the light guide member 24b and is photoelectrically detected by the photomultiplier 25b. The emitted light 13b is converted by the photomultiplier 25b into an analog electric signal $S_B$. In this manner, two electric signals $S_A$ and $S_B$ representing the radiation image information are obtained.

The electric signal $S_A$, which has been generated by the photomultiplier 25a, is successively fed into the logarithmic amplifier 26a, the filter 27a, and the analog-to-digital converter 28a. Ultimately, the electric signal $S_A$ is converted into an image signal S1. The image signal S1 is fed out from the analog-to-digital converter 28a and fed into the operation processing circuit 40. Also, the electric signal $S_B$, which has been generated by the photomultiplier 25b, is successively fed into the logarithmic amplifier 26b, the filter 27b, and the analog-to-digital converter 28b. Ultimately, the electric signal $S_B$ is converted into an image signal S2. The image signal S2 is fed out from the analog-to-digital converter 28b and fed into the operation processing circuit 40. The image signal S1, which has been obtained by detecting the light 13a emitted from the upper surface side of the stimulable phosphor sheet 1, will hereinbelow be referred to as the stimulating ray irradiation surface side image signal S1. Also, the image signal S2, which has been obtained by detecting the light 13b emitted from the lower surface side of the stimulable phosphor sheet 1, will hereinbelow be referred to as the other surface side image signal S2.

The operation processing circuit 40 receives the stimulating ray irradiation surface side image signal S1 and the other surface side image signal S2. The operation processing circuit 40 performs an addition operation on the stimulating ray irradiation surface side image signal S1 and the other surface side image signal S2 and in accordance with the operation processing parameters having been set by the parameter setting means 50. From the addition operation, an addition image signal S3 representing a superposition image is obtained as the operation-processed image signal. The addition image signal S3, which has been obtained from the operation processing circuit 40, is fed into the image processing circuit 60 and subjected to predetermined image processing. The image signal, which has been obtained from the image processing circuit 60, is fed into image output means (not shown), such as a CRT display device, and utilized for outputting a visible image.

Figures 3, 4A, 4B:
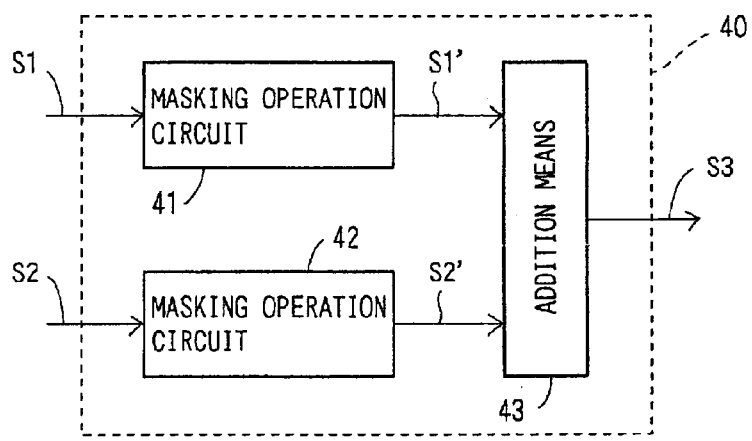
FIG. 3 is a block diagram showing an operation processing circuit.
FIG. 4A is an explanatory view showing examples of masking processing parameters, which are set in cases where an ordinary image read-out operation is performed.
FIG. 4B is an explanatory view showing examples of masking processing parameters, which are set in cases where a pixel density of an image is one half of the pixel density of an ordinary image.

As illustrated in FIG. 3, the operation processing circuit 40 comprises a masking operation circuit 41 for performing a masking operation on the stimulating ray irradiation surface side image signal S1, and a masking operation circuit 42 for performing a masking operation on the other surface side image signal S2. The operation processing circuit 40 also comprises addition means 43 for performing the addition operation on a stimulating ray irradiation surface side image signal S1', which has been obtained from the masking operation, and an other surface side image signal S2', which has been obtained from the masking operation. In this manner, the addition operation is performed on the image signals S1' and S2', which have been obtained from the filtering processing with the masking operations. (The filtering processing with the masking operation will hereinbelow be referred to also as the masking processing.)

As the filtering processing with the masking operation, one of various known filtering processing techniques may be employed. For example, a processing technique for performing wavelet transform on an image signal to obtain wavelet transform factor signals of different frequency bands may be employed. The processing technique for performing the wavelet transform is disclosed in, for example, Japanese Unexamined Patent Publication No. 7(1995)-319092. In cases where the processing technique disclosed in Japanese Unexamined Patent Publication No. 7(1995)-319092 is employed, in the addition means 43, the addition operation may be performed with weight factors appropriate for each of the stimulating ray irradiation surface side and the other surface side and with respect to each of the frequency bands.

As described above, in the operation processing circuit 40, the operation processing parameters conforming to the read-out conditions, including the specifications of the stimulable phosphor sheet 1, under which read-out conditions the image read-out operation is performed, are set. Therefore, in the masking operation circuit 41 and the masking operation circuit 42, the masking operations are performed by utilizing weight factors for obtaining good image quality in each frequency band and in accordance with the operation processing parameters having been set. In this manner, the addition image signal S3 appropriate for the read-out conditions, which have been set for the image read-out operation, is obtained from the addition means 43.

As described above, in cases where the specifications of the stimulable phosphor sheet 1 are such that the stimulable phosphor sheet 1 allows the detection of an image signal from its one surface alone, the operation processing parameters are set such that an image is constituted from only the image signal detected from the one surface of the stimulable phosphor sheet 1. Therefore, in such cases, for example, the electric signal $S_B$ having been detected from the other surface side of the stimulable phosphor sheet 1 is ignored, and the signal based upon only the electric signal $S_A$, which has been detected normally from the stimulating ray irradiation surface side of the stimulable phosphor sheet 1, is outputted as the addition image signal S3.

Examples of how the read-out sensitivity ratio and the operation processing parameters are controlled (set) will be described hereinbelow.

The read-out conditions, such as the level of stimulation energy, the read-out pixel density, and the pixel sampling frequency, are set in accordance with the performance required of the image to be obtained.

By way of example, in cases where the level of stimulation energy varies, the intensity of the light emitted from the stimulating ray irradiation surface side of the stimulable phosphor sheet 1 and the intensity of the light emitted from the other surface side of the stimulable phosphor sheet 1 alter. As a result, the frequency response and noise characteristics of the image signal, which is obtained from each of the opposite surfaces of the stimulable phosphor sheet 1, varies. In such cases, for example, if the image signals, which have been obtained from the opposite surfaces of the stimulable phosphor sheet 1, are weighted with the identical values of weight factors and subjected to the addition operation, an appropriate image cannot always be obtained.

Also, extensive research conducted by the inventors revealed that, besides the intensities of the light emitted from the opposite surfaces of the stimulable phosphor sheet 1, the ratio between the intensities of the light emitted from the opposite surfaces of the stimulable phosphor sheet 1 also alter in accordance with the level of stimulation energy. It was also found that, even though the read-out sensitivity with respect to each of the opposite surfaces of the stimulable phosphor sheet 1 is adjusted, in many cases, if the ratio between the read-out sensitivities with respect to the opposite surface sides of the stimulable phosphor sheet 1 is kept at a predetermined value, the image signal gathering range will vary for the opposite surface sides of the stimulable phosphor sheet 1 when the level of stimulation energy alters. In other words, in cases where the ratio between the read-out sensitivities with respect to the opposite surface sides of the stimulable phosphor sheet 1 is adjusted in accordance with the level of stimulation energy, the image signal gathering ranges with respect to the opposite surface sides of the stimulable phosphor sheet 1 are capable of being kept identical with each other, and an operation-processed image having good image quality is capable of being obtained.

Ordinarily, in cases where the level of stimulation energy is set to be high, the intensity of the light emitted from the other surface side of the stimulable phosphor sheet 1 becomes comparatively high, and the emitted light intensity ratio (i.e., the ratio of the intensity of the light emitted from the stimulating ray irradiation surface side of the stimulable phosphor sheet 1 to the intensity of the light emitted from the other surface side of the stimulable phosphor sheet 1) becomes low. Therefore, in such cases, the read-out sensitivity with respect to the other surface side of the stimulable phosphor sheet 1 may be set to be comparatively low, i.e., the read-out sensitivity ratio P may be set to be high. In this manner, the image quality of the operation-processed image is capable of being kept good.

The parameter referred to as the read-out sensitivity ratio is the parameter, which is obtained only in the technique for detecting light emitted from opposite surfaces of a stimulable phosphor sheet and thereby detecting two image signals from the opposite surfaces of the stimulable phosphor sheet. In the cases of a technique for detecting light emitted from only a one surface of a stimulable phosphor sheet and thereby detecting an image signal from only the one surface of the stimulable phosphor sheet, the image signal is obtained only from the one surface of the stimulable phosphor sheet, and therefore the parameter referred to as the read-out sensitivity ratio cannot be considered. With the radiation image information read-out method and apparatus in accordance with the present invention, instead of the read-out sensitivity with respect to each of the opposite surface sides of the stimulable phosphor sheet 1 being merely controlled, the novel parameter referred to as the read-out sensitivity ratio, which parameter is obtained in the technique for detecting light emitted from opposite surfaces of a stimulable phosphor sheet and thereby detecting two image signals from the opposite surfaces of the stimulable phosphor sheet, is controlled. In this manner, with the radiation image information read-out method and apparatus in accordance with the present invention, an appropriate operation-processed image is capable of being obtained regardless of the level of stimulation energy, which acts as the read-out conditions.

Parameters for the masking processing are set such that the addition ratio of the stimulating ray irradiation surface side image signal to the other surface side image signal is controlled to be equal to a desired value for each frequency. For example, in the ordinary image read-out operation, the masking processing parameters may be set such that the addition ratio of the stimulating ray irradiation surface side image signal to the other surface side image signal is set to be 4:6 at a frequency of 0.5 cycle/mm, 5:5 at a frequency of 1 cycle/mm, and 6:4 at a frequency of 2 cycles/mm. In such cases, if the same values of the masking processing parameters are applied to an image having a low pixel density (e.g., an image having a pixel density equal to one half of the pixel density of the ordinary image), the addition ratio of the stimulating ray irradiation surface side image signal to the other surface side image signal at each frequency alters such that the addition ratio is 4:6 at a frequency of 0.25 cycle/mm, 5:5 at a frequency of 0.5 cycle/mm, and 6:4 at a frequency of 1 cycle/mm. As a result, the frequency characteristics of the operation-processed image signal vary.

Therefore, in order for the addition ratio with respect to each frequency, which addition ratio takes the same value as that of the addition ratio for the ordinary image, to be obtained for the image having the low pixel density, it is necessary to set the masking processing parameters such that the weight of the middle region is comparatively heavy. For example, as illustrated in FIG. 4A, in cases where the masking processing parameters with respect to 5×5 pixels are set, the masking processing parameters in the ordinary image read-out operation may be set to be 11111, 12221, 12321, 12221, and 11111. In such cases, as illustrated in FIG. 4B, as for the image having the pixel density equal to one half of the pixel density of the ordinary image, the masking processing parameters may be set to be 00000, 01110, 01310, 01110, and 00000. In this manner, in cases where the pixel density varies, the image quality of the operation-processed image is capable of being kept good.

Further, in cases where the pixel sampling frequency varies, if the masking processing parameters are kept at predetermined values, the frequency characteristics of the image signal will vary. In cases where it is considered that the stimulation power is kept at a predetermined value, a high sampling frequency means that the level of stimulation energy per pixel becomes low. Therefore, the processing may be performed in the same manner as that described above for the cases where the level of stimulation energy varies. In this manner, in cases where the pixel sampling frequency varies, the image quality of the operation-processed image is capable of being kept good.

In the embodiment described above, the specifications of the stimulable phosphor sheet 1 are discriminated by reading the bar code appended to the stimulable phosphor sheet 1. Alternatively, for example, an ID code representing the specifications of the stimulable phosphor sheet 1 may be inputted from a keyboard, or the like.

Also, in the embodiment described above, both of the read-out sensitivity ratio and the operation processing parameters are controlled (set) in accordance with the read-out conditions. Alternatively, only either one of the read-out sensitivity ratio and the operation processing parameters may be controlled.

Further, in the embodiment described above, by the utilization of the table prepared previously, the read-out sensitivity ratio and the operation processing parameters are controlled so as to conform to the read-out conditions. Alternatively, when each of image read-out operations is performed, the read-out sensitivity ratio and the operation processing parameters conforming to the read-out conditions maybe calculated in accordance with a predetermined rule.

Furthermore, in the embodiment described above, the operation processing circuit 40 performs the addition operation. However, the radiation image information read-out method and apparatus in accordance with the present invention are not limited to the embodiment described above. For example, a stimulable phosphor sheet, on which a high energy image for energy subtraction processing has been recorded with radiation having a high energy level and a low energy image for energy subtraction processing has been recorded with radiation having a low energy level, may be employed. A high energy image signal, which represents the high energy image, may be detected with the photomultiplier 25a. Also, a low energy image signal, which represents the low energy image, may be detected with the photomultiplier 25b. Further, in the operation processing circuit 40, a subtraction operation may be performed on the high energy image signal and the low energy image signal.

What is claimed is:

1. A radiation image information read-out method, comprising the steps of:

i) exposing a stimulable phosphor sheet, on which radiation image information has been stored, to stimulating rays, which cause the stimulable phosphor sheet to emit light in proportion to the amount of energy stored thereon during its exposure to radiation, ii) detecting light emitted from opposite surfaces of the stimulable phosphor sheet when the stimulable phosphor sheet is exposed to the stimulating rays, two original image signals representing the radiation image information being thereby acquired, and iii) performing operation processing on the two original image signals and in accordance with predetermined operation processing parameters, an operation-processed image signal, which represents the radiation image information, being thereby obtained, wherein a ratio between read-out sensitivities with respect to the opposite surface sides of the stimulable phosphor sheet and/or the predetermined operation processing parameters with respect to at least either one surface side of the stimulable phosphor sheet are controlled in accordance with read-out conditions employed at the time of the image signal acquisition.

2. A method as defined in claim 1 wherein the operation processing is an addition operation.

3. A method as defined in claim 1 wherein the operation processing is a subtraction operation.

4. A method as defined in claim 1 wherein the ratio between read-out sensitivities with respect to the opposite surface sides of the stimulable phosphor sheet is controlled in accordance with read-out conditions employed at the time of the image signal acquisition.

5. A method as defined in claim 1 wherein the operation processing includes a first masking operation which filters one of the two original image signals, a second masking operation which filters the other of the two original image signals, and an addition operation which adds the filtered one of the two original image signals to the other of the filtered two original image signals.

6. A method as defined in claim 5 wherein the ratio between read-out sensitivities with respect to the opposite surface sides of the stimulable phosphor sheet is controlled in accordance with read-out conditions employed at the time of the image signal acquisition.

7. A radiation image information read-out apparatus, comprising:
  i) stimulating ray irradiation means for irradiating stimulating rays to astimulable phosphor sheet, on which radiation image information has been stored, the stimulating rays causing the stimulable phosphor sheet to emit light in proportion to the amount of energy stored thereon during its exposure to radiation,
  ii) image signal acquiring means for detecting light emitted from opposite surfaces of the stimulable phosphor sheet when the stimulable phosphor sheet is exposed to the stimulating rays, and thereby acquiring two original image signals representing the radiation image information, and
  iii) operation-processed image signal forming means for performing operation processing on the two original image signals and in accordance with predetermined operation processing parameters in order to obtain an operation-processed image signal, which represents the radiation image information,
  wherein the improvement comprises the provision of control means for controlling a ratio between read-out sensitivities with respect to the opposite surface sides of the stimulable phosphor sheet and/or the predetermined operation processing parameters with respect to at least either one surface side of the stimulable phosphor sheet, the controlling being performed in accordance with read-out conditions employed at the time of the image signal acquisition.

8. An apparatus as defined in claim 7 wherein the operation processing is an addition operation.

9. An apparatus as defined in claim 7 wherein the operation processing is a subtraction operation.

10. An apparatus as defined in claim 7 wherein the provision of control means controls the ratio between read-out sensitivities with respect to the opposite surface sides of the stimulable phosphor sheet.

11. An apparatus as defined in claim 7 wherein the operation-processed image signal forming means includes a first masking operation circuit which filters one of the two original image signals, a second masking operation circuit which filters the other of the two original image signals, and an addition means for performing an addition operation on the filtered one of the two original image signals and the filtered other of the two original image signals.

12. An apparatus as defined in claim 11 wherein the provision of control means controls the ratio between read-out sensitivities with respect to the opposite surface sides of the stimulable phosphor sheet.

* * * * *